No. 814,667. PATENTED MAR. 13, 1906.
C. E. BINNINGS.
MIXING PLANT.
APPLICATION FILED JUNE 30, 1905.
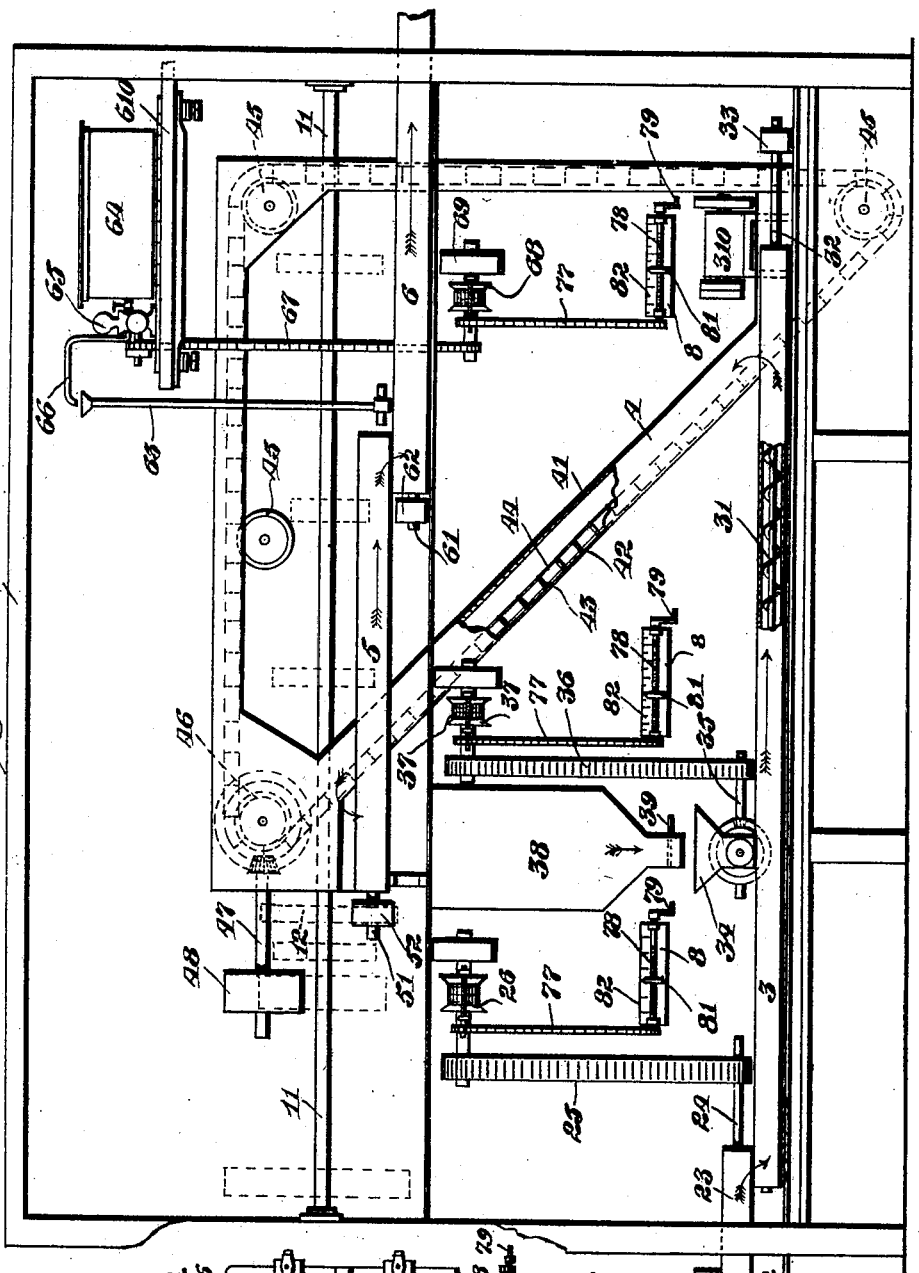
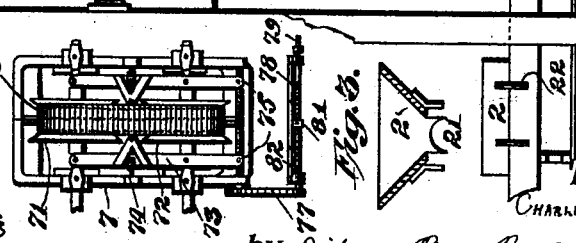
Attest:
C. M. Mitchell
A. L. O'Brien
Inventor:
Charles Elijah Binnings
by Dickerson, Brown, Raegener & Bundy
Attys.

UNITED STATES PATENT OFFICE.

CHARLES ELIJAH BINNINGS, OF STAMFORD, TEXAS, ASSIGNOR TO ERIC PIERSON SWENSON, OF NEW YORK, N. Y.

MIXING PLANT.

No. 814,667.  Specification of Letters Patent.  Patented March 13, 1906.

Application filed June 30, 1905. Serial No. 267,744.

*To all whom it may concern:*

Be it known that I, CHARLES ELIJAH BINNINGS, a citizen of the United States, and a resident of Stamford, Texas, have invented certain new and useful Improvements in Mixing Plants, of which the following is a specification.

My invention relates to mixing plants—*e. g.*, such as are used for mixing feeds or the like.

It comprises novel means for handling, conveying, and mixing the several materials which constitute the feed and for accurately determining the proportion of each of such materials.

In the drawings, Figure 1 represents in diagrammatic elevation a mixing plant embodying my invention. Fig. 2 is a top plan view, on an enlarged scale, of a speed governing and indicating device. Fig. 3 is an end elevation of a hopper forming part of my device.

1 designates a suitable structure, shown as a two-story building having a line-shaft 11 passing therethrough, rotated from any suitable source of power. (Not shown.)

2 designates a hopper the bottom of which is open and the front end of which is formed with a semicircular recess 21. (Clearly shown in Fig. 3 of the drawings.) The hopper 2 is guided by lugs 22 to move longitudinally of the trough 23, in which is a screw conveyer mounted on a shaft 24, connected by a belt 25 to a power-transmitting device 26, which may be connected by a belt (not shown) to a suitable pulley on the main shaft 11. The forward end of the trough 23 dumps into a trough 3, in which is a screw conveyer 31, driven by a shaft 32, having a pulley 33, which may be connected, as before, to the main shaft 11. Emptying into the trough 3 is a measuring-funnel 34, the shaft 35 of which is connected by a belt 36 to a second power-transmitting device 37. Above the funnel 34 is a hopper 38, provided with a gate 39. Also emptying into the trough 3 is a rough-feed cutter 310. The trough 3 at its discharge end empties into a drag-conveyer 4, shown as having an inclined leg 41, over the bottom 42 of which moves scrapers 43, secured to a chain 44. The chain 44 passes over idler-pulleys 45 and is driven by a pulley 46, geared to a shaft 47, on which is a driven pulley 48, which may be belted to the main shaft 11. The conveyer 4 discharges at the upper end of its inclined leg 41 into a trough 5, which, as before, is provided with a continuous feed-screw, mounted on a shaft 51, having a pulley 52, which may be belted to a relatively large driving-pulley 12 on the main shaft 11. At its discharge end the trough 5 empties into a trough 6, which, as before, is provided with a screw conveyer mounted on a shaft 61, on which is a pulley 62. Leading into the trough 6, adjacent to its feed end, is a tube 63, which serves to carry a liquid from a tank 64 through a pump 65 and spout 66. The pump 65 is connected by a belt 67 to a third power-transmitter 68, connected by a pulley 69 and belt (not shown) to a suitable pulley on the main shaft 11.

The speed-transmitting devices 26, 37, and 68 are, as shown, of the Reeves' type; but it is obvious that any type of speed device in which the increment in speed is practically continuous may be employed. The device shown consists, essentially, of driving and driven pulleys 71 and 72, mounted in a frame 7, the pulleys 71 and 72 consisting of two portions having conical adjacent faces capable of being moved toward and from each other by levers 73, pivoted at 74. It will be seen from Fig. 2 that the arrangement is such that when the ends 75 of the levers 73 are moved toward each other the conical portions of the driving-pulleys 71 will be moved apart and the belt 76 will slip down nearer to the axis of the pulleys. At the same time the halves of the driven pulley 72 will be forced together, so that the belt 76 will ride outward on their inclined faces. It is obvious that in this way the speed of the driven pulley will be decreased, while the reverse motion of the levers 73 will increase the speed of the driven pulley 72. The device thus described forms no part of my present invention, as it is well known in the art. In the device, as shown, the ends 75 of the levers 73 are connected together by a right and left screw running in suitable nuts at the ends of the levers. This screw has at its end a sprocket-wheel, which is connected by a chain 77 to a sprocket-wheel mounted on a shaft 78, which is provided with a handle 79, located at a convenient point to be operated by one standing on the floor of the mill. The shaft 78 is mounted in suitable bearings on a board 8 and is screw-threaded for an indicator-nut 81, which as the shaft 78 is turned passes over a series of indicating guide-marks 82, which in practice may be provided with suitable designating characters.

I will explain the operation of my device in connection with the manufacture of a stock-feed. Into the hopper 2, which may be moved along to any convenient point on the trough 23, is thrown a continuous supply of one material—e. g., cotton-seed hulls. By reason of the recessed face 21 of the forward end of the hopper 2 the conveying-screw, which it is understood is similar to the screw 31 (shown in Fig. 1,) always carries a full load, which is deposited into the feed end of the trough 3. The hopper 38 may be used to hold meal of any desired nature. The gate 39 being opened, this meal drops into the hopper 34, from whence it is fed, by means of the power-gate 35, into the trough 3. The cutter 310 may be used to deposit in the trough 3 roughage, as cut sorghum-stalks or the like. It will be understood that the screw 31 acts to a considerable extent to mix the hulls from the hopper 2 and the meal from the hopper 38. These, with the cut stalks from the cutter 310, are carried through the conveyer 4 and deposited into the trough 5 near its feed end. The trough 5 is run at a considerable speed, so as to thoroughly mix the three materials together, and at its discharge end empties into the trough 6, as shown. Into the trough 6, adjacent its feed end, is fed a supply of liquid food, as molasses, from the tank 64, the supply being graduated by the pump 65. The screw conveyer in the trough 6 acts to moisten the solid materials and to thoroughly mix them with each other and with the molasses or other liquid, discharging them at its outer end into a spout, (not shown,) from which they may be conveyed to the car or wagon, as desired.

A special feature of my device is that each of the materials may be exactly measured without interrupting the operation of the machine, so that the proportions of the various materials in the feed may be adjusted as desired. This I accomplish by the means already described, whereby the operator by turning the handle 79 is enabled to vary continuously and accurately the speed of any of the shafts by which each of the screw conveyers or the pump is run. In practice the graduations 82 on the board 8 may be marked with figures indicating not the speed of revolution of the screw-conveyer shaft, as 24, or of either of the pulleys 71 or 72, but with characters indicating the number of pounds, bushels, or other units of the particular material delivered. To facilitate this exactness of mixture, I have shown the molasses-tank 64 as mounted on a scale 610, by means of which the weight of a given quantity of molasses in the tank 64 may be ascertained and the amount of its dilution calculated.

It is obvious that the indicator for showing the quantity of any desired material fed into the mixed mass may be used with any device in which the effective diameter of the driving and driven pulleys, or either of them, may be varied, or, more broadly, it may be used in connection with any variable-speed-power-transmitting device in which the variation is either continuous or by very small increments.

By making the hopper, such, e. g., as that marked Fig. 1 in the drawings, longitudinally movable along the trough into which it feeds the operator is enabled to easily fill the same from any desired point with a minimum of labor, while the amount carried by the screw is unchanged.

It is evident that the particular arrangement of the plant is unimportant and subject to considerable change, as desired.

What I claim is—

1. In a mixing plant, a conveying and mixing trough, means for continuously feeding a plurality of different materials to said trough, a second mixing and conveying trough, means for delivering the mixed contents of said first-named trough to said last-named trough, means for feeding a liquid material to said last-named trough, and independent means for varying the quantity of each of said materials fed to said troughs.

2. In a mixing plant, a conveying and mixing trough, means for continuously feeding a plurality of different materials to said trough, a second mixing and conveying trough, means for delivering the mixed contents of said first-named trough to said last-named trough, means for feeding a liquid material to said last-named trough, and independent means including an indicating-gage for varying the quantity of each of said materials fed to said troughs without interruption of the feeding and mixing operations.

3. In a mixing plant, a conveyer-trough, a rotary feed-screw in said trough, and a hopper movable longitudinally of said trough and having its forward end formed with a projection extending downwardly into said trough and recessed to fit the periphery of said screw.

4. In combination, a power-transmission device, means for varying the speed of the driven portion of said device including a threaded shaft, and an indicating device comprising a second threaded shaft, means connecting said shafts for simultaneous movement, manual means for turning said last-named shaft at will, a nut longitudinally movable on said last-named shaft, and a scale on which said nut runs.

5. In combination with a power-transmitting device comprising driving and driven pulleys and levers for simultaneously varying their effective diameters, a right and left screw for moving said levers, a manually-operated threaded shaft for turning said screw, a nut restrained from rotary motion and movable longitudinally on said shaft, and a scale over which said nut passes, said nut and said scale together forming an indicating-gage for determining the speed of the driven pulleys.

In testimony whereof I have signed this specification in the presence of two subscribing witnesses.

CHARLES ELIJAH BINNINGS.

Witnesses:
 WALTER L. ORR,
 H. G. NOLD.